United States Patent
Ng (10) Patent No.: US 12,131,116 B2
(45) Date of Patent: Oct. 29, 2024

(54) FOCUSED SCREEN DATA FIELD PRESENTATION FOR ENTRY OF DATA ASSOCIATED WITH AN ELECTRONIC FORM INTO A QUICK ENTRY SYSTEM

(71) Applicant: Nicholas Ng, Torrance, CA (US)

(72) Inventor: Nicholas Ng, Torrance, CA (US)

( * ) Notice: Subject to any disclaimer, the term of this patent is extended or adjusted under 35 U.S.C. 154(b) by 0 days.

(21) Appl. No.: 17/526,850

(22) Filed: Nov. 15, 2021

(65) Prior Publication Data

US 2022/0075934 A1 Mar. 10, 2022

Related U.S. Application Data

(63) Continuation-in-part of application No. 16/204,005, filed on Nov. 29, 2018, now Pat. No. 11,176,316.

(51) Int. Cl.
*G06F 40/174* (2020.01)
*G06F 3/04842* (2022.01)
*G06F 17/00* (2019.01)

(52) U.S. Cl.
CPC ........ *G06F 40/174* (2020.01); *G06F 3/04842* (2013.01)

(58) Field of Classification Search
CPC ........................... G06F 40/174; G06F 3/04842
USPC .................................. 715/200, 224, 221, 225
See application file for complete search history.

(56) References Cited

U.S. PATENT DOCUMENTS

| | | | |
|---|---|---|---|
| 6,502,234 B1 * | 12/2002 | Gauthier ................... | G06F 8/34 717/109 |
| 8,977,951 B2 * | 3/2015 | Ethier ....................... | G06F 8/38 715/275 |
| 9,009,585 B1 * | 4/2015 | Chetrit .................... | G06F 9/453 715/221 |
| 9,262,393 B2 * | 2/2016 | Naderi .................. | G06F 40/174 |
| 9,582,484 B2 * | 2/2017 | Gajera .................. | G06F 40/186 |
| 11,144,715 B2 * | 10/2021 | Paterson ................ | G06V 10/40 |
| 2002/0013788 A1 * | 1/2002 | Pennell ................. | G06Q 20/108 715/224 |
| 2002/0129004 A1 * | 9/2002 | Bassett ................... | G06Q 30/02 |
| 2002/0156846 A1 * | 10/2002 | Rawat .................... | G06Q 30/04 715/744 |
| 2003/0043187 A1 * | 3/2003 | Li ........................... | G06F 9/453 715/749 |
| 2003/0048300 A1 * | 3/2003 | Li ........................... | G06F 9/453 715/762 |
| 2003/0101070 A1 * | 5/2003 | Mahosky ........... | G06Q 30/0601 705/26.1 |
| 2004/0153343 A1 * | 8/2004 | Gotlib .................... | G16H 10/60 705/3 |
| 2005/0071752 A1 * | 3/2005 | Marlatt ................. | G06F 40/186 715/222 |

(Continued)

*Primary Examiner* — Manglesh M Patel
(74) *Attorney, Agent, or Firm* — RC Trademark Company (57) ABSTRACT

A quick entry method includes receiving receive, at a device comprising a screen, a selection of a portion of a screen, which corresponds to a section of a regular form. A sectional data separation process is performed to identify and separate the section of the regular form into a plurality of individual questions. Each of the plurality of individual questions is formatted for the screen. The plurality of individual questions is displayed, one at a time, on the device comprising the screen. Each of the plurality of individual questions comprising one or more data input fields for a user to complete.

14 Claims, 7 Drawing Sheets

(56) References Cited

U.S. PATENT DOCUMENTS

| | | | |
|---|---|---|---|
| 2005/0209903 A1* | 9/2005 | Hunter | G06Q 10/06316 705/7.26 |
| 2006/0026500 A1* | 2/2006 | Qa 'Im-maqami | G06F 40/174 715/226 |
| 2006/0074719 A1* | 4/2006 | Horner | G16H 10/20 705/3 |
| 2006/0123331 A1* | 6/2006 | Hightower | G06F 40/174 715/224 |
| 2008/0082909 A1* | 4/2008 | Zuverink | G06F 40/174 715/224 |
| 2013/0198628 A1* | 8/2013 | Ethier | G06F 9/453 715/709 |
| 2014/0258838 A1* | 9/2014 | Evers | G06F 40/174 715/234 |
| 2015/0205776 A1* | 7/2015 | Bhatia | G06Q 30/02 715/224 |
| 2017/0039178 A1* | 2/2017 | Eschbach | G06F 40/174 |
| 2017/0262421 A1* | 9/2017 | Yue | H04L 63/00 |
| 2020/0050845 A1* | 2/2020 | Foncubierta Rodriguez | G06V 30/412 |
| 2020/0159821 A1* | 5/2020 | Magdziarz | G06F 40/205 |
| 2021/0240923 A1* | 8/2021 | Martinov | G06F 3/0482 |
| 2022/0019731 A1* | 1/2022 | Matsuo | G06K 9/6267 |
| 2023/0004924 A1* | 1/2023 | Centeno | G06Q 10/083 |

* cited by examiner

FIG. 1

MANUAL ENTRY

| CITY DEVELOPMENT APPLICATION FORM |||||||||||
|---|---|---|---|---|---|---|---|---|---|---|
| APPLICANT: || COMPANY/FIRST NAME ||||| SURNAME ||||
| POSTAL ADDRESS ||||||||||| 
| OWNER NAME: (THIS MUST BE COMPLETED) |||||||||| ☐ AS ABOVE |
| 1 | 2 | 3 | 4 | 5 | 6 | 7 | SSS: |||| ☐ AS ABOVE |
| Q | W | E | R | T | Y | U | OWNER FAX NO. ||| OWNER EMAIL: |
| A | S | D | F | G | H | J | CONTACT PERSON FOR FURTHER INFORMATION |||| ☐ AS ABOVE |
| Z | X | C | V | B | N | M ||||||
| NAME: ||||||| TELEPHONE |||| (W): (M): |
| EMAIL: ||||||| FAX: ||||
| BUILDER NAME: ||||||| BUILDERS EMAIL: ||||
| BUILDER POSTAL ADDRESS: ||||||| CONTACT NO.: LICENSE NO.: ||||
| CURRENT USE OF PROPERTY: ||||||||||| 
| DESCRIPTION OF PROPOSAL: ||||||| DEVELOPMENT COST $ ||||
| LOCATION OF PROPOSAL ||||||||||| 
| STREET NO: |||| STREET: |||| SUBURB: |||
| LOT NO: |||| SECTION: || PLAN: || VOLUME: | FOLLOW: ||
| OFFICE USE ONLY ||||||||||| 
| REGISTRATION DATE: / / 2017 |||||| ZONE: || WARD: ||
| BUILDING RULES CLASSIFICATION ||||||||||| 
| CLASSIFICATION SOUGHT: ||||||||||| 
| IF CLASS 5, 6, 7, AND 9 CLASSIFICATION IS SOUGHT, STATE THE PROPOSED NUMBER OF EMPLOYEE ||||||| MALE: FEMALE: ||||
| IF CLASS 6E CLASSIFICATION IS SOUGHT, STATE THE NUMBER OF PERSONS FOR WHOM COMPLICATIONS IS PROVIDED: ||||||||||| 
| IF CLASS 5B CLASSIFICATION IS SOUGHT, STATE THE PROPOSED NUMBER OF OCCUPANTS OF THE VARIOUS SPACES AT THE PREMISES ||||||||||| 
| I ACKNOWLEDGE THAT COPIES OF THIS APPLICATION AND SUPPORTING DOCUMENTATION MAY BE PROVIDED TO INTERESTED PERSONS IN ACCORDANCE WITH THE DEVELOPMENT REGULATION, 1993. DEVELOPMENT REQUIRING PUBLIC NOTIFICATION WILL BE MADE AVAILABLE TO THE PUBLIC VIA COUNCIL'S WEB SITE ||||||||||| 
| SIGNATURE: ||||||| DATE: / / ||||

FOCUSED SCREEN DATA FIELD PRESENTATION FOR ENTRY OF DATA ASSOCIATED WITH AN ELECTRONIC FORM INTO A QUICK ENTRY SYSTEM

BACKGROUND

Embodiments of the invention described in this specification relate generally to data entry, and more particularly, to a focused screen data field presentation system and a focused screen data field presentation method for entry of data associated with an electronic form into a quick entry system (QES).

Form data has traditionally been presented in paper format for people to fill out manually. Electronic devices allow for such forms to be presented electronically on screens, with the devices receiving user input by some input device, such as a keyboard, on-screen keyboard, etc. However, forms are typically presented in inefficient and cumbersome ways for users of electronic devices. The inefficient form entry methods that exist presently for software driven applications on electronic devices is a problem for users.

Specifically, all of the existing conventional electronic form systems are based on an old method of displaying entry forms. It is basically placing "a tax filing" type form that lays out fields of entry based on paper and pen design, with no deviation from the paper design.

Therefore, what is needed is a way to improve the delivery and usability of presently inefficient form entry methods when using software driven applications on electronic devices.

BRIEF DESCRIPTION

A novel focused screen data field presentation system and a focused screen data field presentation method are disclosed for entry of data associated with an electronic form into a quick entry system (QES). In some embodiments, the focused screen data field presentation system supports, and the focused screen data field presentation method provides an efficient and effect manner of form entry that supersedes existing conventional electronic form systems and old traditional methods of form entry (which rely on their traditional form layout and design) for websites, mobile devices, computers, and other electronic systems.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel focused screen data field presentation system and a focused screen data field presentation method for entry of data associated with an electronic form into a quick entry system (QES). In some embodiments, the focused screen data field presentation system supports, and the focused screen data field presentation method provides an efficient and effect manner of form entry that supersedes existing conventional electronic form systems and old traditional methods of form entry (which rely on their traditional form layout and design) for websites, mobile devices, computers, and other electronic systems.

As stated above, data entry forms are typically presented in inefficient and cumbersome ways for users of electronic devices. The inefficient form entry methods that exist presently for software driven applications on electronic devices are problematic for users because they tend to be based on old methods of displaying entry forms, e.g., just laying out fields of entry based on paper and pen design, with no deviation from the paper design. This makes display of entry forms a problem, especially for small form factor devices, such as smartphones and smaller tablet computing devices. Embodiments of the focused screen data field presentation system and method for entry of data associated with an electronic form into a QES described in this specification solve such problems by streamlining the data entry process that effectively replaces the old, outdated method of form entry on non-touch screens. Some of the process includes replacing how action button flows, calling/minimizing areas of entry, and creating a quick field maneuvering for the user to effectively focus on completing the form.

Embodiments of the focused screen data field presentation system and method for entry of data associated with an electronic form into a QES described in this specification differ from and improve upon currently existing options. In particular, the existing conventional options are not efficient or effective for most users of devices, especially for smaller devices, such as smartphones and smaller tablet computing devices. For instance, the existing conventional options are at times messy and hard to access depending on the size of the device screen. As such, navigating and entering the requested data or information is much more tedious and cumbersome as well. As an example, an 8"×11" paper size is not meant to be displayed and used in a 2.6"×5.4" screen. In contrast, the focused screen data field presentation system and method for entry of data associated with an electronic form into a QES of the present disclosure provides a new streamlined method of entry with focused screens which supersedes these old traditional methods of form entry which are based on traditional layouts and designs.

The focused screen data field presentation system and method for entry of data associated with an electronic form into a QES of the present disclosure may be comprised of the following elements. This list of possible constituent elements is intended to be exemplary only and it is not intended that this list be used to limit the focused screen data field presentation system and method for entry of data associated with an electronic form into a QES of the present application to just these elements. Persons having ordinary skill in the art relevant to the present disclosure may understand there to be equivalent elements that may be substituted within the present disclosure without changing the essential function or operation of the focused screen data field presentation system and method for entry of data associated with an electronic form into a QES.

1. A selection of choices appearing at the exact location of the pressed action button, to further select derivative option of commands after selecting the first initial command by pressing the button (the derived command options depend on the prior selected command and prior data inputs of one or more completed fields in any prior entry screen)
2. The selection opens an entry screen, where a set of data is needed for entry (forms but in QES format)
3. A title, clearly shown before the form entry field, to mark the focus on what information is needed to be entered
4. A button that expands other sets of fields to enter data on based on the need to modify such data or not during the entry, if not expanded and modified, a default entry is used
5. A back button and a section ribbon to show current or previous fields which will show past titles when hovered over or persistent touch
6. A forward button, if the user goes back on his/her entry, when user has not entered data on this page, a next button in place of the forward button saves the data that is being entered on this page
7. A form entry field, where the data gets typed in, the font will gradually reduce if more information is entered to show maximum data visualization
8. The keyboard will show alphabet, or numerical popups on specific data fields, general keyboard if no specifics are required
9. Next button to head to the next form entry field
10. Submit button once at the end of the entry and all data requirements are fulfilled The focused screen data field presentation system and method for entry of data associated with an electronic form into a QES of the present disclosure generally works by overlaying the form entry system where a user would need to navigate the whole form unnecessarily as the system duplicates a paper based entry form. Instead, the data entry method is evolved towards a singular user experience to counter this issue, effectively having a more focused, seamless and "new" entry method which will be natural as it replaces the need for "traditional" pen and paper viewing of forms.

The logic would just be the systems additional checks to make the process even more seamless, such as not showing a forward button if the user is on the very recent field he/she is working on, which keyboard to show if the data field requires specific data such as numerical only data, what type of field entry is required to trigger which type of display for it and finally a submit button where the user is already on the last line of the entry. Small algorithms that makes the entry process more seamless and anticipatory to the user's flow.

To make the focused screen data field presentation system and method for entry of data associated with an electronic form into a QES of the present disclosure, a person may design, code, and build/deploy a mobile app for mobile devices or conventional computing device software application. The mobile app and/or software application may be designed and coded in a way that implements the method for entry of data associated with the electronic form into a QES of the present disclosure.

Figure 1:
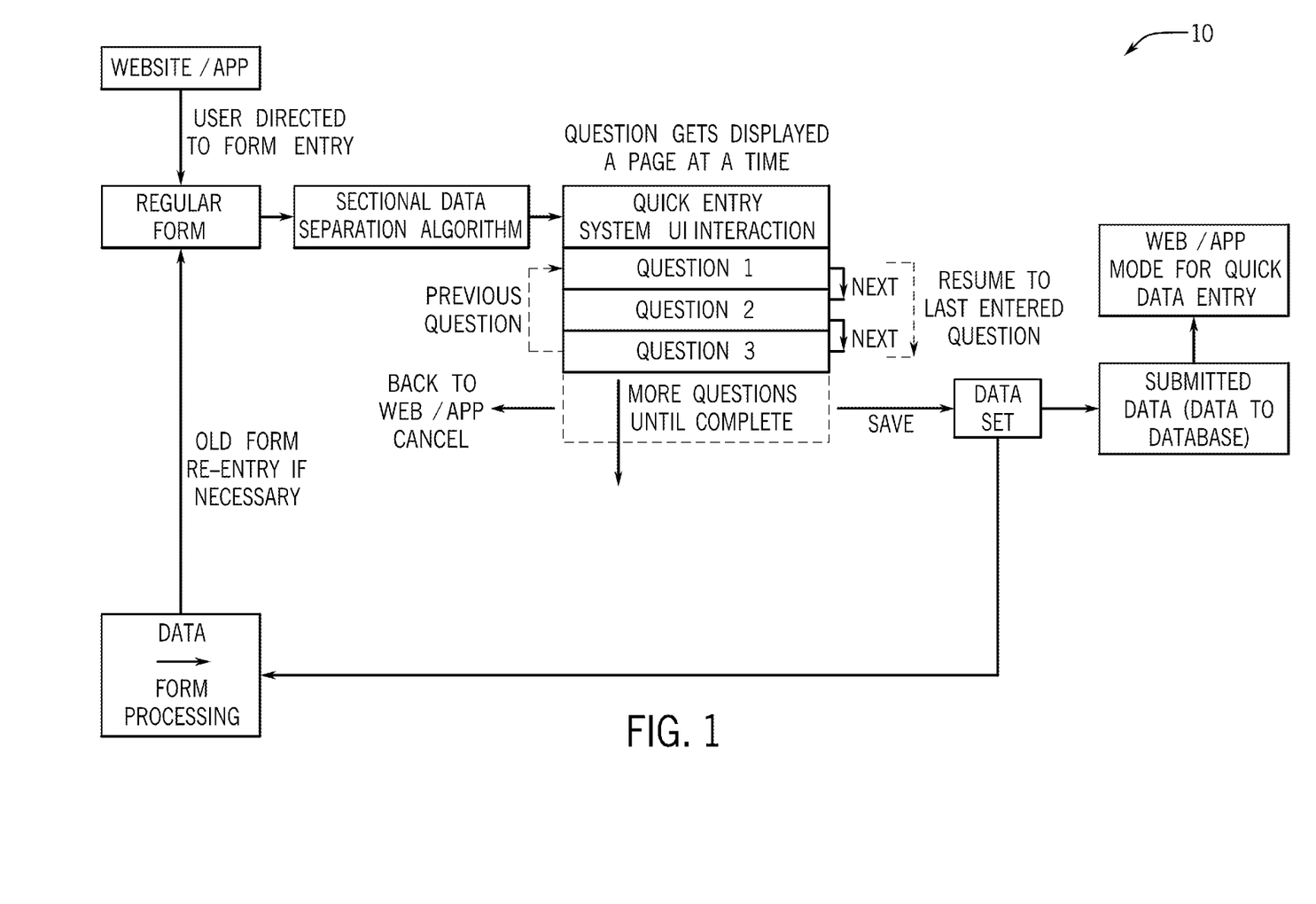
FIG. 1 conceptually illustrates a block diagram of a focused screen data field presentation system in some embodiments.

By way of example, FIG. 1 conceptually illustrates a block diagram of a focused screen data field presentation system 10. As shown in this figure, the focused screen data field presentation system 10 starts from a website/app block. The website/app includes any kind of software application or mobile app which can run on a computing device to allow a user to interact with and navigate to another location for form entry. The user is directed to the form entry from the website or software application. Thus, when the user chooses to navigate to form entry, a regular form is then displayed on the user's device. An example of a regular form is described below by reference to FIG. 2.

The regular form is displayed in its entirety on the user's computing device screen, regardless of design size of the form. When scaled to fit the screen of the user's device, form entry fields are very difficult to read and/or understand. However, the entry form is used in connection with the focused screen data field presentation system 10, the user can easily tap a location on screen that is associated with a certain area of the regular form. For example, the user may tap the screen at a location which corresponds to the top section of the first page of the regular form. When the user selects such a location, a sectional data separation module of the focused screen data field presentation system 10 performs a sectional data separation process (algorithm) to identify and separate different sections of the regular form and to identify and group questions in each section together.

In some other embodiments, the focused screen data field presentation system 10 automatically performs sectional data separation when the regular form is accessed by the user (or navigated to from the website or software application). Whether the user taps to select a starting section in which to aggregate and group questions of a section, or the focused screen data field presentation system 10 automatically separates multiple different sections of the regular form, the focused screen data field presentation system 10 then groups the questions of the section. The questions of the section are the data request fields as shown in the form in relation to that section.

In some embodiments, the focused screen data field presentation system 10 also performs a backend process of creating a sectional data structure or a data object (hereinafter referred to as "sectional data object structure") that encapsulates one or more questions as variables for the sectional data object structure. As shown in the block diagram of the focused screen data field presentation system 10 in FIG. 1, there are at least three questions associated with a particular section. While this is only an example, and a person of ordinary skill in the relevant art would understand that a different section may only have one question or two questions, or may have more than three questions, the example here serves as a typical scenario which is important for presentation at the user interface (UI) level/stage and also equally important for functional efficiency of the computing device which the user is using. Specifically, the generation and creating of sectional data object structures for each section (and only one section of questions at a time), and the subsequent storage of those sectional data object structures after the user inputs data for the group of questions for that section, allows the user's computing device to efficiently handle retrieval, presentation, transmission, and storage of any and all data input related to the entry form. More specifically, the user's real time computing device hardware resources are optimized in terms of processing cycles (CPU processing stress) at runtime and random-access memory (RAM) consumption at runtime. The user's persistent computing device hardware resources are also optimized in terms of long term, non-transitory and persistent data storage, specifically by way of the sectional data object structures that encapsulates data on a section-by-section basis for a given form, and associate all of the sectional data object structures of the given form together, as any one or more of linked connections between the sectional data object structures for a single form, within a superstructure that encapsulates a plurality of the sectional data object structures in a single form-based structure for the given form, etc.

Now, after the focused screen data field presentation system 10 performs sectional data separation and groups the question the given section, then the questions in that given section are displayed on the screen of the user's computing device. In some embodiments, the questions get displayed a page at a time. In some embodiments, a section may include multiple fields (questions) and may sort the questions for display of the fields (questions) in anticipation of the user performing data entry in the UI screen on the device. An example of question data sorting is described below by reference to FIG. 2. Also, examples of presenting the sorted questions from a section are described by reference to FIGS. 3, 5A, and 5B below.

In some embodiments, the questions of a given section are presented via the quick entry system user interface (UI) interaction. The quick entry system UI interaction can continue for any number of questions for the given section as needed. Furthermore, the quick entry system UI interaction can proceed in sequential or non-sequential fashion. For example, the questions can be presented in sequence with corresponding user input provided for each question, or alternatively, the user can drive the order of questions as needed (e.g., starting with the first question, moving to the second, then the third, then going back to the first question, and then moving ahead to the fifth question, and coming back to finish the group of questions in the section with the fourth question). Nevertheless, after the user cycles through the questions of the given section the focused screen data field presentation system 10, the focused screen data field presentation system 10 saves the data set in a sectional data object structure which is stored in a database. In some embodiments, the database is a persistent database that stores data on a permanent storage device of the user's computing device or in a cloud database. In some embodiments, the database is an in-memory database that encapsulates the user inputs for all of the questions of a particular section in a sectional data object structure in memory (RAM), and which later stores multiple sectional data object structures for multiple sections of questions of the form in a persistent database that is stored on a permanent storage device (such as a hard disk of the user's computing device or a cloud database storage device that is accessible to the computing device of the user).

In some embodiments, the focused screen data field presentation system 10 may revert to the website or the software application for quick data entry into the regular form based on the user's data entry inputs in response to the questions. Alternatively, or in conjunction, the focused screen data field presentation system 10 of some embodiments transfers the data input by the user to the form for processing, which may necessitate old form re-entry or may simply create a condition that allows for further processing of the form to skip one or more sections of questions, depending on the user-provided answers to one or more of the questions in a preceding section. Whatever the particular case for a given form, the focused screen data field presentation system 10 continues performing these steps until the form is completed.

To use the focused screen data field presentation system and method for entry of data associated with an electronic form into a QES of the present disclosure, a user will be able to navigate a form and enter data into the form effortlessly and seamlessly. Furthermore, the form is presented in sectional sets of questions that provide even more focused attention on the information that is required of the user and allows the mobile app and/or software application to visually output the focused data requests/fields in a way that does not obfuscate, block, or otherwise misdirect the user. The backend data retrieval, after the user enters the data for the requested form fields, is stored for each section, and data structures for each section are generated in the backend system to replicate the identified sets of data request questions in each section. This will effectively provide a more seamless, efficient and focused approach to filling in information. It eliminates reluctance to use an entry system, and creates time efficiency, improving the system as a whole.

Figure 2:
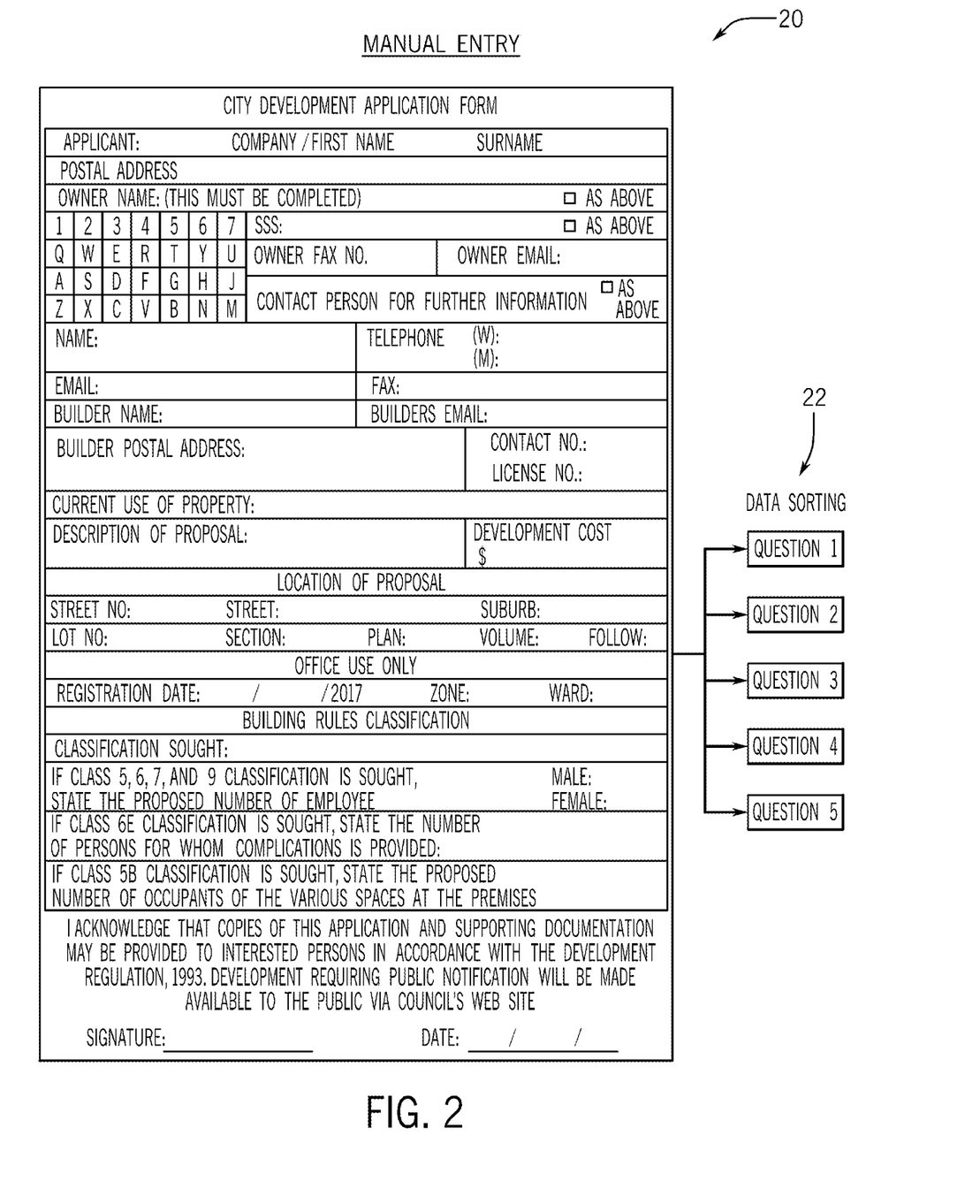
FIG. 2 conceptually illustrates an example of the focused screen data field presentation system in use while individual questions derived from a traditional form are presented electronically to a user.

By way of example, FIG. 2 conceptually illustrates an example of the focused screen data field presentation system in use while individual questions are sorted from a traditional form and are presented electronically to a user. As shown in this figure, the traditional form 20 includes several sections of a "City Development Application Form." The sections of the traditional form 20 are analyzed by the focused screen data field presentation system 10. Specifically, the sectional data separation module analyzes the traditional form 20 and sorts different groups of questions for the multiple sections of the form. In this example, the sorting 22 results in five "Questions" for five sections of the traditional form 20. Next, the quick entry system UI interaction occurs, by presenting UI screens for each set of questions related to each section in the traditional form 20.

Figure 3:
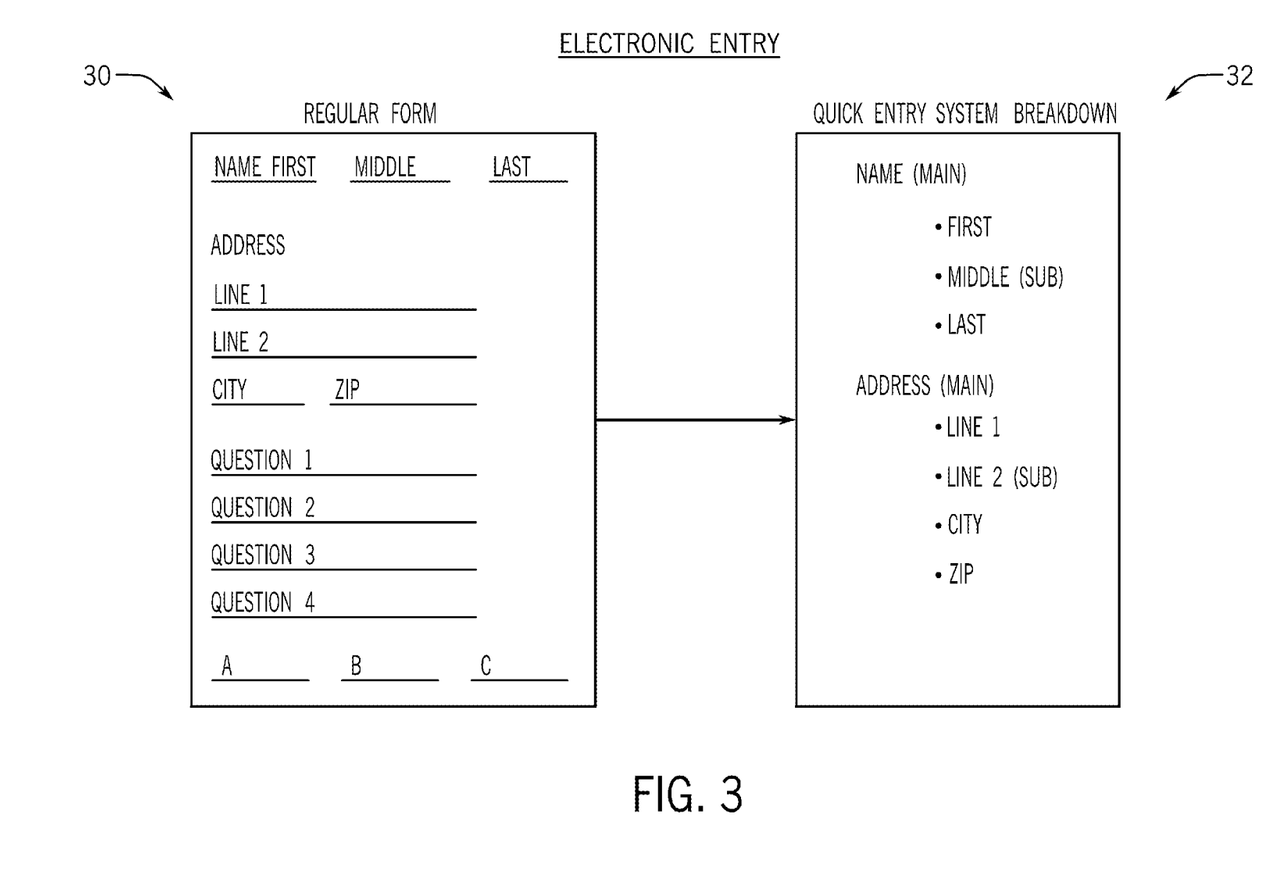
FIG. 3 conceptually illustrates an example of a mobile device presenting a section of form entry fields based on fields in a section of a traditional form.

Turning to an example of the quick entry system UI interaction, FIG. 3 conceptually illustrates an example of a UI screen with a regular form view 30 and a quick entry system breakdown view 32 which is related to a section of the form with question fields in the section of the traditional form 20. As can be seen in these UI screens, the user can easily navigate through the required data input fields to complete that particular section of the traditional form 20.

Figure 4:
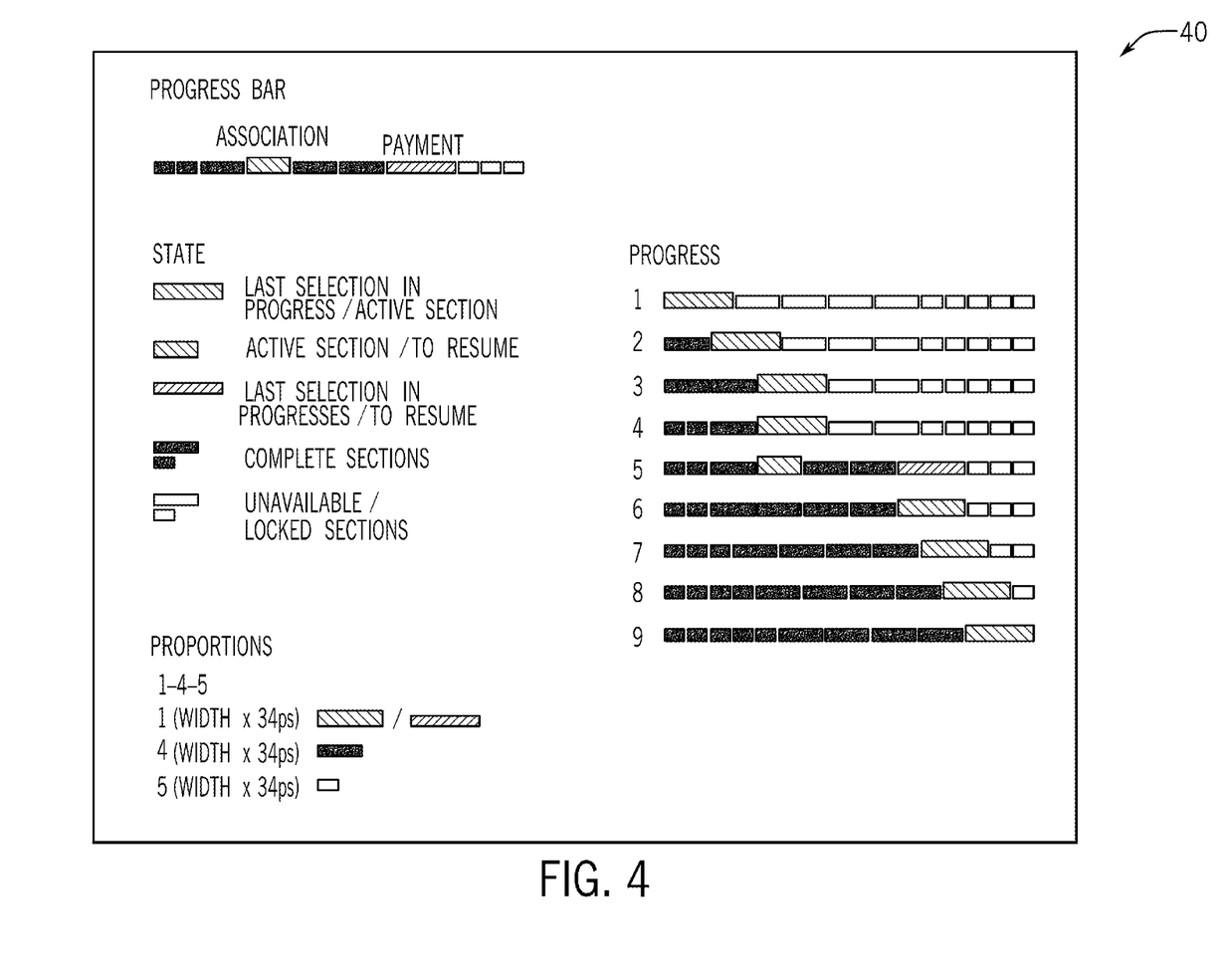
FIG. 4 conceptually illustrates a progress evaluation and efficiency metric screenshot provided by the focused screen data field presentation system in connection with a saved form that is partially completed.

Now turning to another example, FIG. 4 conceptually illustrates a progress evaluation and efficiency metric UI screen 40 provided by the focused screen data field presentation system in connection with a saved form that is partially completed. The progress evaluation and efficiency metric UI screen 40 allows the user to easily save data before completing any given form, and then to come back into the focused screen data field presentation system 10 at any later time to complete the form. As shown, the progress bar gives the user enough information to understand how much remains to be completed for the given form. In this example, the "Association" section is presently active and the "Payment" section is the last section that was in progress and in need to be completed. Other sections remain to be started/completed in the form, but are not accessible now (until either or both of the "Association" and/or "Payment" sections are completed).

Figure 5A:
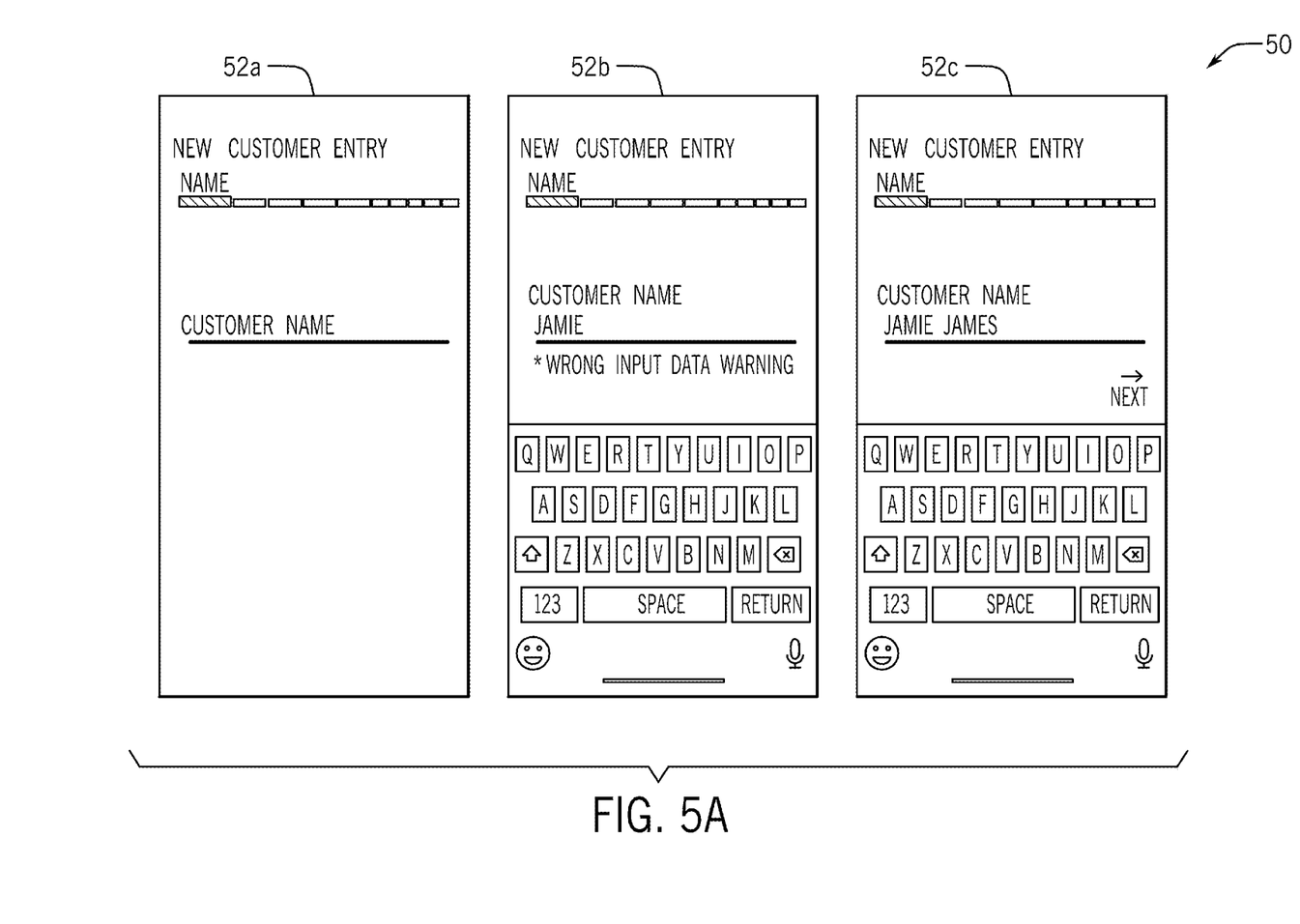
FIG. 5A conceptually illustrates examples of data entry fields of a section of a traditional form.

By way of example, FIG. 5A conceptually illustrates examples of data entry fields 50 of a section of a traditional form. As shown in this figure, the data entry fields 50 include a first UI screen 52*a* that is presented on a mobile device of a user. The first UI screen 52*a* in this example has a title of "New Customer Entry" and presents a single field for the user to input the customer name. When the user inputs a name into the customer name field, a virtual keyboard is displayed to allow alpha-numeric data input by the user. As shown in the second UI screen 52*b*, the user has only input the customer name as "Jamie" with nothing more. This has triggered an error: "Wrong Input Data Warning". The error is triggered in this case because the system expected to receive a first name and a last name of the customer, and the mere entry of "Jamie" was not sufficient. However, the user corrects this in the third UI screen 52*c* where "Jamie James" is shown in the customer name field and a "Next→" arrow is displayed upon entry of the proper customer name data.

Figure 5B:
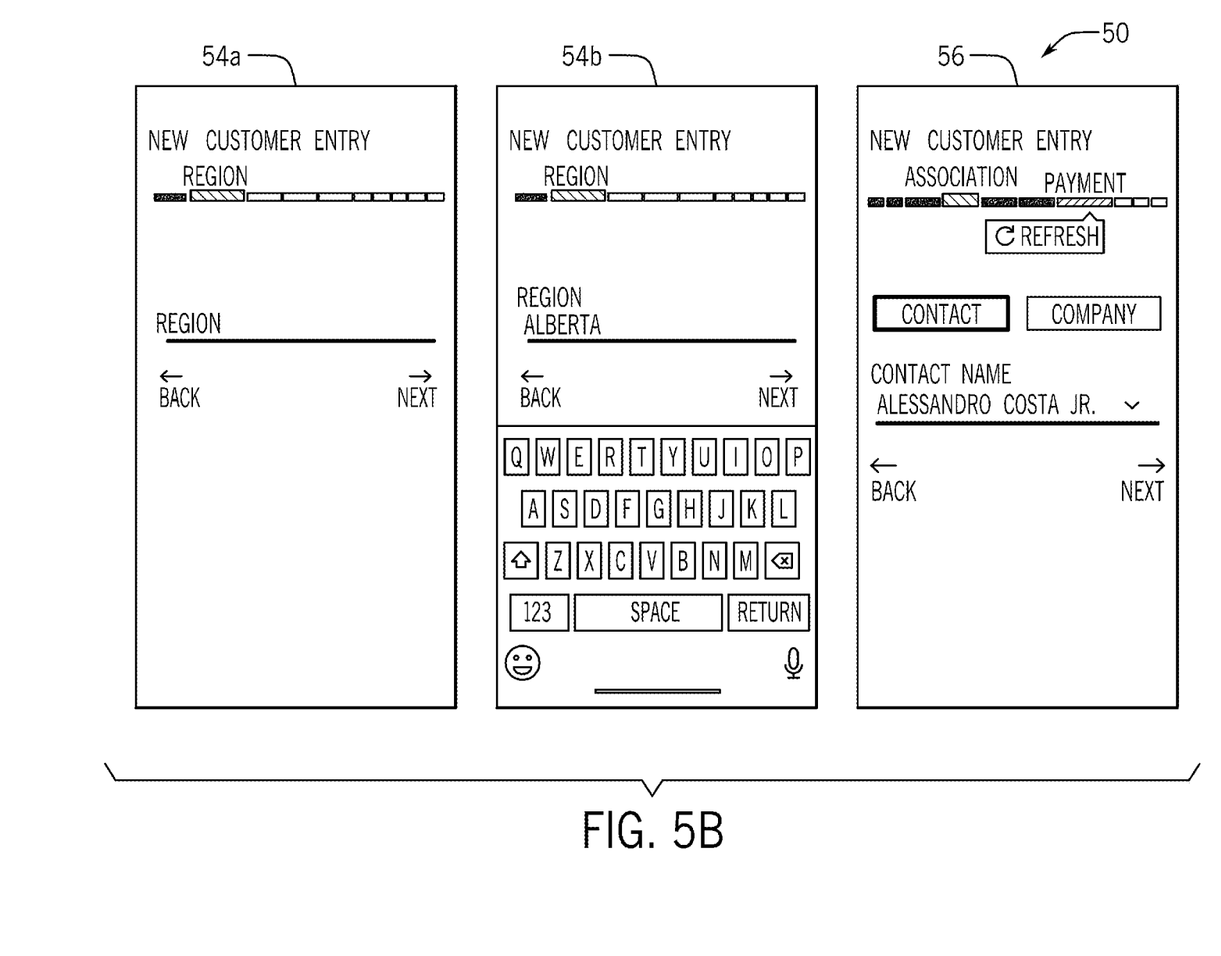
FIG. 5B conceptually illustrates some more examples of data entry fields of the section of the traditional form.

Now turning to FIG. 5B, which conceptually illustrates some more examples of data entry fields 50 of the section of the traditional form. Specifically, the data entry fields show a fourth UI screen 54*a*, a fifth UI screen 54*b*, and a sixth UI screen 56 for the "New Customer Entry" section. In the fourth UI screen 54*a*, a new data field is visually output: "Region". The user can select to go "←Back" or "Next→" as desired. As shown in the fifth UI screen 54*b*, the user has entered "Alberta" for the "Region" data entry field. Next, in the sixth UI screen 56, the user is presented with a "Contact Name" data entry field, to which the user inputs "Alessandro Costa Jr.". Also, the sixth UI screen 56 allows the user to specify a "Contact" or a "Company" to enter at this stage. In terms of the progress bar, the "Association" section either requires both a "Contact" and a "Company" or will allow the user to proceed if either one of a "Contact" or a "Company" is entered. Again, the sectional analysis forms a dependency chain that determines which data input constraints are considered mandatory and which are optional.

Additionally, the focused screen data field presentation system and method for entry of data associated with an electronic form into a QES of the present disclosure can be adapted for use in any data entry process required of a user in any kind of display not limited to a computer, tablet, or mobile device (e.g., smartphone), but to all display screens that would prompt the user for requested data entry. The whole philosophy of entry can be applied to any interaction that requires visual and tactile human input/interaction.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
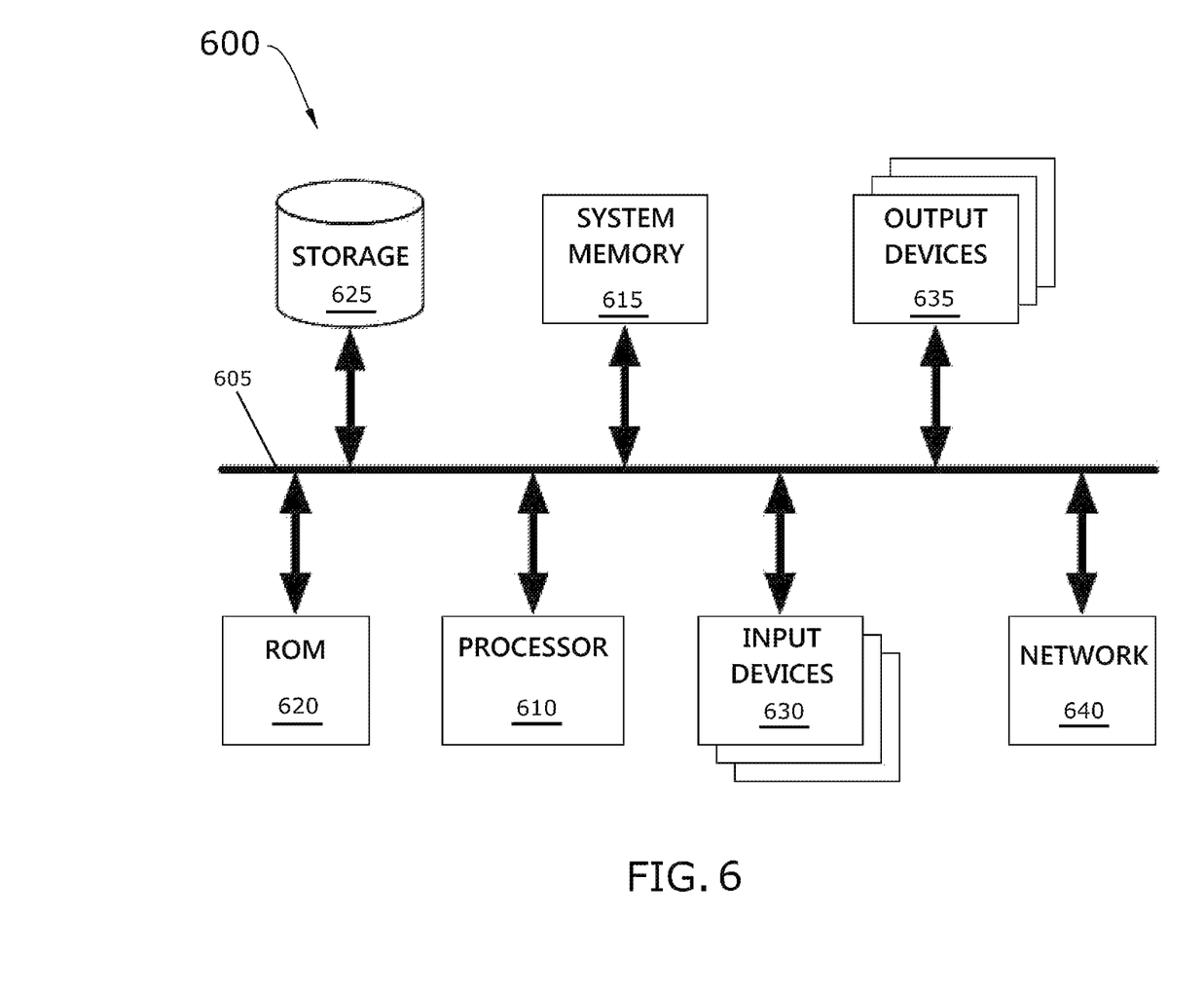
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images generated by the electronic system 600. The output devices 635 include printers and display devices, such as cathode ray tubes (CRT) or liquid crystal displays (LCD). Some embodiments include a touchscreen that functions as both an input and output device.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

In some embodiments, the purpose of the present system may be to have the user quickly understand the information they are queried on, without the need to deviate his/her focus on the questions on the form or the whole list of information that may be needed from them. Most websites, systems, or applications (apps) are still using traditional entry methods where they are replicating an entire form that they see as a whole sheet, while enabling devices to quickly zoom on a section for them to be able to see enough of the field to fill information on. Some websites, systems, or applications (apps) have updated form entry systems, where they are changing the layout of the traditional paper form (which uses and entire sheet of paper as a surface to enter information on preset boxes or fields, to something more vertical in display, where users can scroll through the entire screen for them to be able to asses all required information to fill in.

The method and system described herein focuses on specific topics and subjects such as name, address, identification, preferences (individual topics), questions and other fields that a user may be required to fill out via traditional form, but instead may be separated and broken down to individual sections, so the user can focus on answering a specific question at a specific time, without distraction of the other questions that no doubt would require the user to answer as well during the form filling session.

This method of entry ensures that the user's attention will only be focusing on a specific topic at one time (and in some cases a single question at a time), completing this required information without any other distraction, prior to moving to the next question by, for example, the user may be prompted by triggering a next button, and after pressing the next button, the previous answer will be saved, and the next question will be queried. The fact that only 1 specific question may be asked of the user to answer is where this system may differ than anything else that may be in existence in any other system, where forms are designed to be queried as a form as a whole, to the user at an indiscriminate form, where the questions are displayed at a layout that merely focuses on the ability to display such question on the screen, without separating them out to its most basic layout, that requires user to only see and focus on one question, topic, section at a time.

While a computer may consist of a large monitor, capable of displaying multitudes of data on the screen where users are able to quickly glance, and have self-reliance on which parts of the screen to consciously decide on which fields they will be answering on, thus, traditional paper like forms or even a more update digital form with layout that may be more suited for computer viewing may be possible, the present embodiments may lessen the burden of stress of the individual over the potential large amount of information that the user needs to attend to, but also in the fact that user needs some bandwidth of their attention to consciously or unconsciously sort out the abundance of information that may be displayed on the screen for the user to attempt to focus and answer. The purpose may be to reduce the amount of information that the user needs to see at any given time, thus reducing the stress from overabundance of question that require them to process, and directing them one question at a time, which in effect simplifies it for the user which enables them to focus their attention to a quick question, without them needing to redundantly see or think about the next questions at the same time.

The present embodiments are designed to improve filling out forms when performed on a small mobile device screen such as cellular phones, or any devices that has screens smaller than 7" in size measured diagonally. When used in conjunction with a small device that has a screen size of smaller than 7" enables the user to quickly see, read, understand the specific question that is part of a form and enable them to quickly answer them to get to the next question by triggering a next button, of which the previous answer will be saved, and the next question will be queried. A progress bar may be displayed on the top of the screen to ensure users know which section they are in as proportion to the whole form, and to enable user to quickly scroll and select a previous question to correct any previously saved answer to the question. It may also allow a user to quickly trigger the return button which will take user back to the last question where user was interacting with and is yet to answer, thus allowing them to effectively navigate in and out of sections that need correction, and then resuming their efforts to complete the questionnaire. The present embodiments may also be used to improve filling out forms on screens that are greater than 7" measured diagonally by having the questions displayed in a pop up with darkened background which simulates the focus area and/or visibility of a smaller screen, or, it may be displayed in its entirety on the larger screen but not deviating from its concept of displaying one question at a time. For example, the present system may be used on large screens, such as screens that are typically in a kiosk associated with a fast food restaurant. Ordering food in these kiosks tend to be confusing especially in a crowded restaurant where there are many distractions so it is easy for a user to make mistakes in an order. The present system may be able to automatically determine a size of the screen when a user accesses a form that it is being displayed on and then format each question for the particular sized screen.

Using the present embodiments with a small device that has a screen size of smaller than 7" will effectively reduce user's need to redundantly navigate through a paper form that may be zoomed out or zoomed in, whichever the form's position is on the screen and the need for user to interact with the screen which possibly involve zooming in, zooming out, moving the screen, closing the keyboard, for visibility of the form on the screen.

The present embodiments may also effectively reduce the amount of visible questions that will appear even if the form is using an updated vertical fill type form that basically converts old traditional paper like forms to a more updated digital screen UI, but still in the means of a form regardless, and its vertical layout in nature still fills the screen with questions that may not be relevant for what the user is focusing on but is still relevant as part of the form, but this overabundance of information produces stress for its viewer, and a distraction.

The present system may break down a user's form into specific sections that will take no more than 2-3 fields to enter at any given time. Such fields may need to be relevant to the part of the question, such as a name section may have 3 fields requiring first, last and middle name, or an address may require first line, second line and property number, whereas city, zip and country may be split for locality information as part per attempt to limit the amount of questions that may be presented to the user at any given time.

The present system may determine the required information as most forms or questionnaires are generally similar, but the length and amount of information that is often required differs from one website to the next. The present system may have standard information queries grouped in logical sets where it can be easily used to determine the sections that need to be created from the user's form.

In an event where some questions or sections are not familiar to the present system, the system may still separate the questions or sections using the name of the question itself as the section title, and may by default be asked one at a time to prevent misidentification of the section's subject matter.

The website owner or manager will still be able to view the system's translation of the sections based on the form presented, and may configure the sections manually where the system itself may not have identified them properly.

While the invention has been described with reference to numerous specific details, one of ordinary skill in the art will recognize that the invention can be embodied in other specific forms without departing from the spirit of the invention. For instance, FIG. 1 conceptually illustrates a block diagram of a focused screen data field presentation system that performs a process. The specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention may be not to be limited by the foregoing illustrative details, but rather is to be defined by the appended claims.

I claim:

1. A non-transitory computer-readable medium storing program code, the program code executable by a computing device to cause the computing device to perform a quick entry method:
   receive, at a device comprising a screen, a selection of a portion of a screen, which corresponds to a section of a regular form;
   perform, via a processor, a sectional data separation process to identify and separate the section of the regular form into a plurality of individual questions, each of the plurality of individual questions being formatted for the screen;
   display the plurality of individual questions, one at a time, in a pop-up on the device comprising the screen, each of the plurality of individual questions comprising no more than three data input fields for a user to complete; and
   determining sections that need to be created from a user's form based on standard information queries grouped in logical sets and a length and amount of information that is required wherein in a case that one or more questions are not stored in the standard information queries, separated questions use a name of a question itself as a section title.

2. The non-transitory computer-readable medium of claim 1, wherein the user starts the quick entry method by opening the regular form on the device comprising the screen and the method further comprises: displaying a return button to take the user back to a last question that the user was interacting with and has yet to answer and a next button to take the user to a next question.

3. The non-transitory computer-readable medium of claim 1, wherein the screen, measured diagonally, is less than 7 inches.

4. The non-transitory computer-readable medium of claim 1, wherein the screen, measured diagonally, is greater than 7 inches.

5. The non-transitory computer-readable medium of claim 1, wherein the screen comprises progress bar is displayed on a top of the screen.

6. The non-transitory computer-readable medium of claim 1, wherein in a case where one or more questions are not stored in the standard information queries, questions are asked one at a time with the name of the question as the section title.

7. The non-transitory computer-readable medium of claim 1, wherein the pop-up comprises a darkened background.

8. A method to present a quick entry form to a user, the method comprising:
   receiving, at a device comprising a screen, a selection of a portion of a screen, which corresponds to a section of a regular form;

perform, via a processor, a sectional data separation process to identify and separate the section of the regular form into a plurality of individual questions, each of the plurality of individual questions being formatted for the screen; and display the plurality of individual questions, one at a time, in a pop-up on the device comprising the screen, each of the plurality of individual questions comprising no more than three data input fields for a user to complete; and determining sections that need to be created from a user's form based on standard information queries grouped in logical sets and a length and amount of information that is required wherein in a case that one or more questions are not stored in the standard information queries, separated questions use a name of a question itself as a section title.

9. The method of claim 8, wherein the user starts the quick entry system method by opening the regular form on the device comprising the screen and the method further comprises:

displaying a return button to take the user back to a last question that the user was interacting with and has yet to answer and a next button to take the user to a next question.

10. The method of claim 8, wherein the screen, measured diagonally, is less than 7 inches.

11. The method of claim 8, wherein the screen, measured diagonally, is greater than 7 inches.

12. The method of claim 8, wherein the screen comprises progress bar is displayed on a top of the screen.

13. The method of claim 8, further comprising:

determining sections that need to be created from the user's form based on standard information queries grouped in logical sets and a length and amount of information that is required.

14. The method of claim 8, wherein the pop-up comprises a darkened background.

* * * * *